United States Patent
Werner et al.

(10) Patent No.: US 11,439,870 B2
(45) Date of Patent: Sep. 13, 2022

(54) EQUIPMENT USE TRACKING AND AVAILABILITY PREDICTION

(71) Applicant: INTERNATIONAL BUSINESS MACHINES CORPORATION, Armonk, NY (US)

(72) Inventors: John S. Werner, Fishkill, NY (US); Byron S. Green, Poughkeepsie, NY (US); Arkadiy O. Tsfasman, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 951 days.

(21) Appl. No.: 16/212,548

(22) Filed: Dec. 6, 2018

(65) Prior Publication Data

US 2020/0179760 A1    Jun. 11, 2020

(51) Int. Cl.
*A63B 24/00* (2006.01)
*G06N 5/04* (2006.01)

(52) U.S. Cl.
CPC .......... *A63B 24/0075* (2013.01); *G06N 5/04* (2013.01); *A63B 2225/00* (2013.01)

(58) Field of Classification Search
CPC ... A63B 24/0075; A63B 2225/00; G06N 5/04
See application file for complete search history.

(56) References Cited

U.S. PATENT DOCUMENTS

| | | | |
|---|---|---|---|
| 7,038,855 B2 | 5/2006 | French et al. | |
| 8,622,873 B2 | 1/2014 | McGown | |
| 9,364,713 B2 | 6/2016 | Alsalem | |
| 2010/0056341 A1 | 3/2010 | Ellis et al. | |
| 2015/0022663 A1* | 1/2015 | Wang | G08B 13/19602 348/148 |
| 2015/0170530 A1 | 6/2015 | Damman et al. | |
| 2017/0039480 A1 | 2/2017 | Bitran et al. | |
| 2017/0224214 A1* | 8/2017 | Saigh | A61B 5/6801 |
| 2018/0117418 A1 | 5/2018 | Davis | |
| 2018/0147449 A1 | 5/2018 | Duale et al. | |
| 2018/0336687 A1* | 11/2018 | Mudretsov | G06V 40/16 |
| 2020/0410375 A1* | 12/2020 | Seagraves | G01S 19/01 |

* cited by examiner

*Primary Examiner* — Haoshian Shih
(74) *Attorney, Agent, or Firm* — Kunzler Bean & Adamson; Bruce R. Needham

(57) ABSTRACT

Apparatuses, systems and computer-implemented methods are disclosed for equipment use tracking and availability prediction. A monitor module may electronically monitor use of equipment by a plurality of users at one or more locations, by obtaining information about equipment use from sensing equipment that identifies users and times of use for the equipment. A profile module may store a plurality of user profiles based on the information about equipment use. User profiles may include information about the users indicating equipment used and time of use. A prediction module may send a recommendation indicating predicted equipment availability to a user based on current information about equipment use and on the user profiles.

18 Claims, 6 Drawing Sheets

EQUIPMENT USE TRACKING AND AVAILABILITY PREDICTION

BACKGROUND

The subject matter disclosed herein relates to equipment use tracking and more particularly relates to use tracking and availability prediction for various types of equipment.

Various types of facilities, such as gyms, workshops, design studios, or the like, may provide various types of equipment for people at the facility to use. Waiting for equipment to become available may be inconvenient or inefficient. For example, gym equipment may be used by multiple gym members or users, for exercise. A person who wants to use a piece of equipment may find that another person is already using that piece of equipment. It may be unclear whether the person using the equipment is nearly finished or if that person will continue using the same equipment for a long time. Someone who wants to use that piece of equipment for an exercise may wait an indeterminate amount of time, may use alternative equipment that is less effective for the exercise, or may skip the exercise entirely due to not knowing when the equipment will be available. Looking for open equipment, waiting for equipment, substituting alternative equipment, and/or skipping an exercise may make gym use less convenient and/or less effective than when equipment is available.

SUMMARY

An apparatus is disclosed for equipment use tracking and availability prediction. A system and computer-implemented method also perform the functions of the apparatus. According to an embodiment of the present invention, a monitor module electronically monitors use of equipment by a plurality of users at one or more locations, by obtaining information about equipment use from sensing equipment that identifies users and times of use for the equipment. In a certain embodiment, a profile module stores a plurality of user profiles based on the information about equipment use. In a further embodiment, the user profiles include information about the users indicating equipment used and time of use. In certain embodiments, a prediction module sends a recommendation indicating predicted equipment availability to a user based on current information about equipment use and on the user profiles. In various embodiments, at least a portion of the modules may include hardware circuits, programmable hardware devices, and/or executable code. In further embodiments, executable code is stored on one or more computer readable storage media.

Systems are disclosed for equipment use tracking and availability prediction. A system, in one embodiment, includes sensing equipment, a monitor module, a profile module, and a prediction module. In a certain embodiment, sensing equipment identifies users and times of use for equipment at one or more locations. In one embodiment, a monitor module electronically monitors use of the equipment by a plurality of users, by obtaining information about equipment use from the sensing equipment. In a certain embodiment, a profile module stores a plurality of user profiles based on the information about equipment use. In a further embodiment, the user profiles include information about the users indicating equipment used and time of use. In one embodiment, a prediction module sends a recommendation indicating predicted equipment availability to a user based on current information about equipment use and on the user profiles. In various embodiments, at least a portion of the modules may include hardware circuits, programmable hardware devices, and/or executable code. In further embodiments, executable code is stored on one or more computer readable storage media.

Computer-implemented methods are disclosed for equipment use tracking and availability prediction. A computer-implemented method, in one embodiment, includes electronically monitoring use of equipment by a plurality of users at one or more locations, by obtaining information about equipment use from sensing equipment that identifies users and times of use for the equipment. In a certain embodiment, a computer-implemented method includes storing a plurality of user profiles based on the information about equipment use. In a further embodiment, the user profiles include information about the users indicating equipment used and time of use. In one embodiment, a computer-implemented method includes sending a recommendation indicating predicted equipment availability to a user based on current information about equipment use and on the user profiles.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
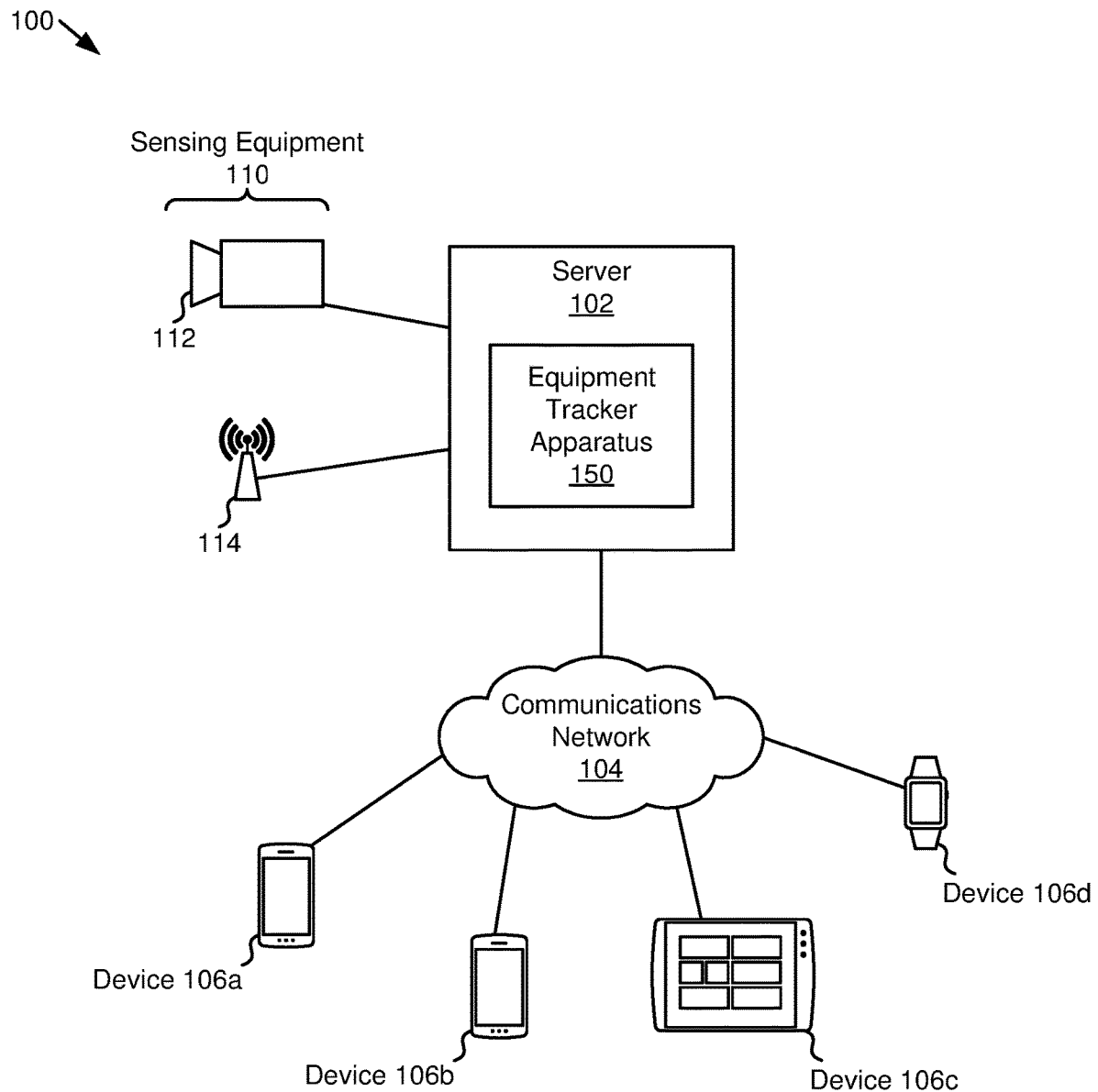
FIG. 1 is a schematic block diagram illustrating one embodiment of a system for equipment use tracking and availability prediction, in accordance with one embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Apparatuses are disclosed for equipment use tracking and availability prediction. In a certain embodiment, an apparatus includes a monitor module, a profile module, and a prediction module. In one embodiment, a monitor module electronically monitors use of equipment by a plurality of users at one or more locations, by obtaining information about equipment use from sensing equipment that identifies users and times of use for the equipment. In a certain embodiment, a profile module stores a plurality of user profiles based on the information about equipment use. In a further embodiment, the user profiles include information about the users indicating equipment used and time of use. In certain embodiments, a prediction module sends a recommendation indicating predicted equipment availability to a user based on current information about equipment use and on the user profiles. In various embodiments, at least a portion of the modules may include hardware circuits, programmable hardware devices, and/or executable code. In further embodiments, executable code is stored on one or more computer readable storage media.

In one embodiment, the sensing equipment includes at least one camera that obtains images of the equipment, and visual recognition software that identifies users based on the images. In a certain embodiment, the sensing equipment includes an indoor positioning system that tracks locations of users' electronic devices.

In one embodiment, a group profile module identifies a group of users using the equipment together based on the information about equipment use, and stores a group profile including information about equipment use by the group. In a further embodiment, the recommendation is further based on the group profile.

In one embodiment, the user profiles are based on equipment use at a plurality of locations, and the recommendation indicates predicted gym equipment availability at the user's location. In a certain embodiment, the prediction module sends a plurality of recommendations to a plurality of users in response to determining that the plurality of recommendations are non-conflicting.

In one embodiment, the equipment is gym equipment, a workout plan includes multiple exercises, and the recommendation indicates predicted equipment availability for at least one exercise selected from the workout plan. In certain embodiments, the workout plan is specified by the user. In some embodiments, the workout plan is suggested by the prediction module based on the current information about equipment use and the user profiles. In one embodiment, the prediction module sends a further recommendation to the user indicating predicted equipment availability for a remaining exercise on the workout plan in response to the user completing an exercise on the workout plan.

In one embodiment, the recommendation is based on machine learning trained on the user profiles to predict equipment availability. In certain embodiments, the recommendation may include a predicted wait time for a piece of equipment, a piece of equipment suggested for the user based on predicted wait times, and/or a suggested time for using a piece of equipment. In one embodiment, the user profiles include information indicating users who share equipment with other users, and the recommendation includes a prediction that a current user for a piece of equipment will share the piece of equipment.

Systems are disclosed for equipment use tracking and availability prediction. A system, in one embodiment, includes sensing equipment, a monitor module, a profile module, and a prediction module. In a certain embodiment, sensing equipment identifies users and times of use for equipment at one or more locations. In one embodiment, a monitor module electronically monitors use of the equipment by a plurality of users, by obtaining information about equipment use from the sensing equipment. In a certain embodiment, a profile module stores a plurality of user profiles based on the information about equipment use. In a further embodiment, the user profiles include information about the users indicating equipment used and time of use. In one embodiment, a prediction module sends a recommendation indicating predicted equipment availability to a user based on current information about equipment use and on the user profiles. In various embodiments, at least a portion of the modules may include hardware circuits, programmable hardware devices, and/or executable code. In further embodiments, executable code is stored on one or more computer readable storage media.

In one embodiment, the sensing equipment includes at least one camera that obtains images of the equipment, and visual recognition software that identifies users based on the images. In a certain embodiment, the sensing equipment includes an indoor positioning system that tracks locations of users' electronic devices.

Computer-implemented methods are disclosed for equipment use tracking and availability prediction. A computer-implemented method, in one embodiment, includes electronically monitoring equipment use by a plurality of users at one or more locations, by obtaining information about equipment use from sensing equipment that identifies users and times of use for the equipment. In a certain embodiment, a computer-implemented method includes storing a plurality of user profiles based on the information about equipment use. In a further embodiment, the user profiles include information about the users indicating equipment used and time of use. In one embodiment, a computer-implemented method includes sending a recommendation indicating predicted equipment availability to a user based on current information about equipment use and on the user profiles.

In one embodiment, a computer-implemented method includes identifying a group of users using the equipment together based on the information about equipment use. In a further embodiment, a computer-implemented method includes storing a group profile including information about equipment use by the group. In a certain embodiment, the recommendation is further based on the group profile.

In one embodiment, the equipment is gym equipment, a workout plan includes multiple exercises, and the recommendation indicates predicted equipment availability for at least one exercise selected from the workout plan. In a further embodiment, a computer-implemented method includes sending a further recommendation to the user indicating predicted equipment availability for a remaining exercise on the workout plan in response to the user completing an exercise on the workout plan.

FIG. 1 depicts one embodiment of a system 100 for equipment use tracking and availability prediction. In the depicted embodiment, the system 100 includes sensing equipment 110, a server 102, an equipment tracker apparatus 150 operating on the server 102, a communications network 104, and a plurality of electronic devices 106, which are described below.

In general, in various embodiments, the equipment tracker apparatus 150 may monitor equipment use by obtaining information from the sensing equipment 110, may store user profiles based on the information about equipment use, and may send a recommendation to a user based on the user profiles and on current information about equipment use, where the recommendation indicates predicted equipment availability. In certain embodiments, predicting equipment availability based on current and past information about equipment use, obtained from sensing equipment 110, may allow a user who receives a recommendation or prediction to exercise more conveniently, efficiently, or effectively than in the absence of a recommendation or prediction. For example, a user who wants to use several pieces of equipment may receive a recommendation indicating predicted wait times for the desired equipment, and may decide what order to use the equipment in based on the predicted wait times. Thus, in various embodiments, using information from sensing equipment 110 to predict equipment availability may reduce or avoid the inefficiency or inconvenience of looking for open equipment, waiting indeterminate amounts of time for equipment to become open, and/or skipping or substituting equipment use when desired equipment is busy. The equipment tracker apparatus 150 is described in further detail below with regard to the apparatuses 300, 400 of FIGS. 3 and 4.

In the depicted embodiment, the equipment tracker apparatus 150 operates on or is embodied by the server 102. In another embodiment, the equipment tracker apparatus 150 may operate on or be embodied by a combination of the server 102 and one or more electronic devices 106 of users. For example, a portion of the equipment tracker apparatus 150 that receives information from a user or sends a recommendation to a user may operate on the user's electronic device 106 and may communicate with the server 102. In another embodiment, the equipment tracker apparatus 150 may operate on or be embodied by one or more computing devices outside a server/client architecture. Various other or further ways to implement an equipment tracker apparatus 150 will be clear in view of this disclosure.

The server 102, in one embodiment, may be a mainframe, a blade server, a workstation, a desktop computer, a laptop computer, a virtual machine, or the like. The server 102 may use the equipment tracker apparatus 150 to monitor equipment use, store user profiles, send recommendations to users, and the like.

In various embodiments, one or more electronic devices 106 may be in communication with the server 102 via the communications network 104. For example, in the depicted embodiment, the electronic devices 106 include mobile phones 106a, 106b, a tablet computer 106c, and a smart watch 106d. In various embodiments, the system 100 may include more or fewer electronic devices 106, including electronic devices 106 of various types, whether depicted or not, such as laptop computers, desktop computers, fitness monitors, or the like. The electronic devices 106 may belong to, be associated with, or be used by one or more users. For example, in certain embodiments, electronic devices 106 may include electronic devices 106 of a plurality of users, and the equipment tracker apparatus 150 may communicate with the electronic devices 106 via the communications network 104 to send recommendations to users, to receive information from or about users, or the like.

The communications network 104, in various embodiments, may include any network or collection of networks that may communicate with the server 102, the electronic devices 106, and/or the sensing equipment 110 to communicate information. For example, in various embodiments, the communications network 104 may include a local area network ("LAN"), a wired network, a wireless network, a mobile data network, the Internet, or the like. The communications network 104 may include one or more connections, switches, routers, data cables, transmitters, and the like normally associated with a communications network 104. In one embodiment, the communications network 104 includes multiple networks functioning to transmit information between the server 102 and the electronic devices 106, between the server 102 and the sensing equipment 110, or the like.

In various embodiments, the equipment tracker apparatus 150 may obtain information about equipment use from the sensing equipment 110. For example, in certain embodiments, the sensing equipment 110 may identify users and times of use for equipment. In various embodiments, sensing equipment 110 may include any electronic equipment for obtaining and/or processing information to determine whether an item of equipment is in use, and if so, what user is using the equipment. In one embodiment, sensing equipment 110 may include at least one camera 112 that obtains images of the equipment. In a further embodiment, sensing equipment 110 may include visual recognition software that identifies users based on images from one or more cameras 112.

A camera 112 may be a digital video camera, a still-image camera configured to photograph equipment periodically or at intervals (e.g., at thirty-second intervals, at one-minute intervals, or the like), a security camera, a webcam, or the like. Various other or further types of cameras 112 will be clear in view of this disclosure. Sensing equipment 110 may include one or more cameras 112 to monitor use of multiple pieces of equipment. The camera 112, in some embodiments, is separate from equipment and is positioned to view users of the equipment. In other embodiments, the camera 112 may be part of the equipment.

Visual recognition software, in various embodiments, may include facial recognition software for identifying users based on images from a camera 112, object recognition software for determining the state of a piece of equipment (e.g., whether a user is actively using the piece of equipment or resting), or the like. Various other or further types of visual recognition software will be clear in view of this disclosure. Visual recognition software may execute on or be embodied by the server 102 (e.g., as part of the equipment tracker apparatus 150) or as a separate application, or may execute on computing equipment other than the server 102, and may communicate with the equipment tracker apparatus 150 via the communications network 104.

As described above, sensing equipment 110, in various embodiments, may identify users and times of use for equipment. For example, in one embodiment, where the sensing equipment 110 includes at least one camera 112 and visual recognition software, the visual recognition software may identify a user in an image of equipment from a camera 112, and a timestamp or other time metadata for the image (e.g., a creation time recorded by the camera 112, a time when the image was received by the visual recognition software, or the like) may indicate a time when the equipment was in use by that user. Timestamps or other time metadata for a series of images of the same equipment from the camera 112, in which the visual recognition software identifies the same user, or identifies that the user is no longer using the equipment, may establish a duration of use, a start time and end time, or the like.

In other embodiments, the sensing equipment 110 includes sensors and/or user identification equipment within the equipment. For example, the equipment may include a fingerprint sensor, a card reader, a terminal to input an ID number of a user, or the like, which may be used to identify when a particular user is using the equipment.

In a certain embodiment, sensing equipment 110 may include an indoor positioning system 114 that tracks locations of users' electronic devices 106. An indoor positioning system 114 may include a plurality of base stations that communicate wirelessly with user's electronic devices 106. For example, in one embodiment, users at a location may sign electronic devices 106 into a Wi-Fi network based on any one of the Institute of Electrical and Electronics Engineers ("IEEE") 802.11 standards, and the base stations for the indoor positioning system 114 may be wireless access points for the Wi-Fi network. In various embodiments, the indoor positioning system 114 may periodically determine distances between users' electronic devices 106 and the wireless access points or base stations, and may determine locations of the users' electronic devices 106 based on distances from multiple base stations (e.g., by triangulation).

For example, in one embodiment, the indoor positioning system 114 may periodically "ping" an electronic device 106 from the wireless access points or base stations, and determine distances from to the electronic device 106 based on the strength of a return signal from the electronic device 106 at the different base stations. Various other or further ways for an indoor positioning system 114 to wirelessly determine locations of electronic devices 106 will be clear in view of this disclosure.

In certain embodiments, the sensing equipment 110 may identify users and times of use for equipment based on the indoor positioning system 114 determining locations of users' electronic devices 106. For example, a floor plan of a location may be divided into different regions near or corresponding to different pieces of equipment, and the sensing equipment 110 may determine that a user is using a piece of equipment by using an indoor positioning system 114 to determine that the user's electronic device 106 is located in the region corresponding to that piece of equipment.

In one embodiment, sensing equipment 110 identifying users and times of use for equipment may include communicating users and times of use directly to the equipment tracker apparatus 150. In another embodiment, sensing equipment 110 identifying users and times of use for equipment may include communicating other or further information to the equipment tracker apparatus 150 from which users and times of use may be determined, such as a series of timestamped images of equipment and a list of users identified in the timestamped images by the visual recognition software, a list of user locations determined by the indoor positioning system 114, or the like.

In the depicted embodiment, the sensing equipment 110 includes cameras 112 and an indoor positioning system 114. In certain embodiments, information from cameras 112 and an indoor positioning system 114 may identify users and times of use more accurately than information from cameras 112 alone, or from an indoor positioning system 114 alone. However, in another embodiment, sensing equipment 110 may include one or more cameras 112 without an indoor positioning system 114, an indoor positioning system 114 without cameras 112, or the like.

In the depicted embodiment, the sensing equipment 110 is in direct communication with the server 102. For example, a camera 112 may be connected to a server 102 via a Universal Serial Bus ("USB") connection. In another embodiment, sensing equipment 110 may communicate with the equipment tracker apparatus 150 via the communications network 104. For example, a camera 112 may communicate with the server 102 via a Wi-Fi network, a wired LAN, the Internet, or the like.

Figure 2:
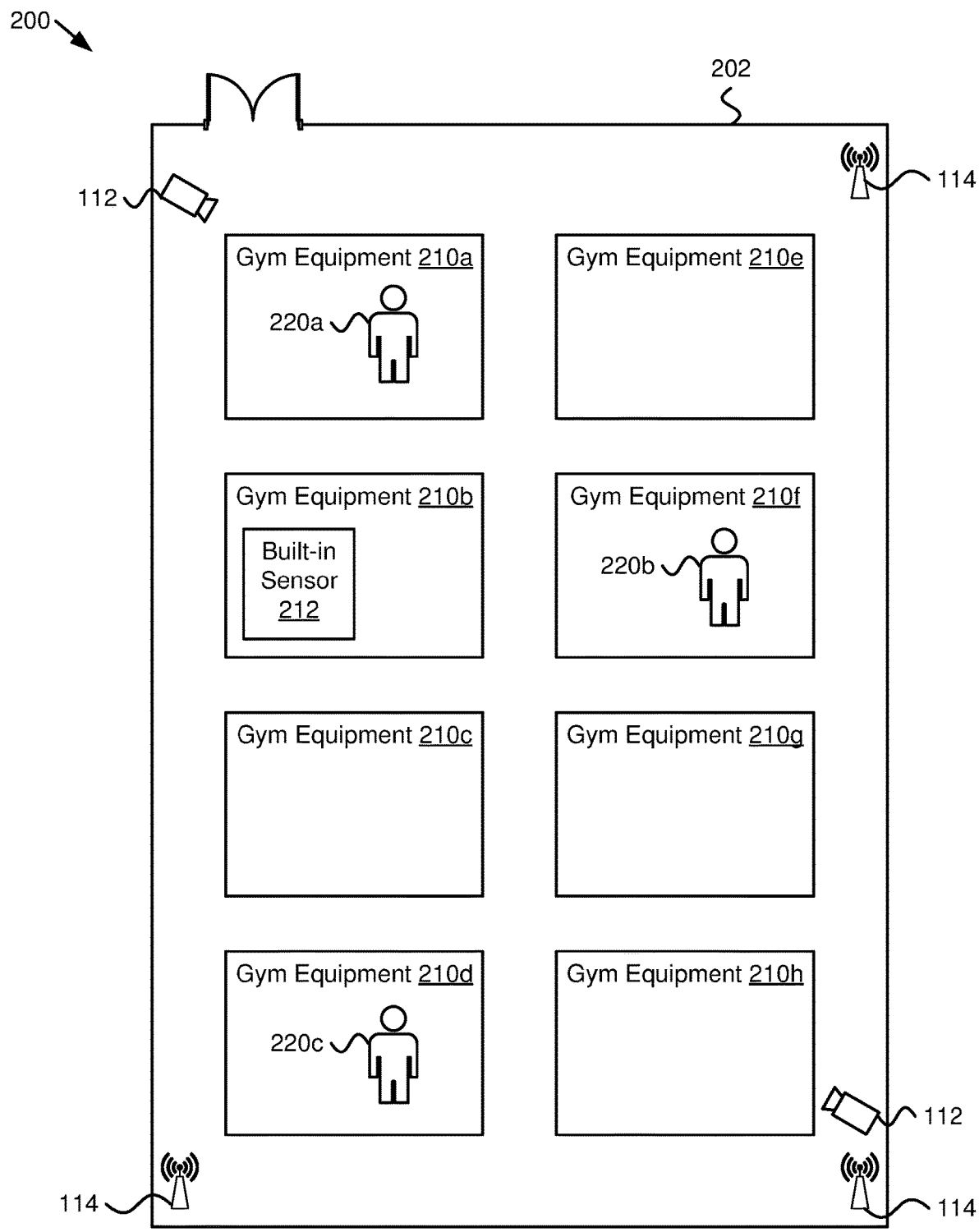
FIG. 2 is a top view illustrating circumstances in which a system or apparatus for equipment use tracking and availability prediction would be used, in accordance with one embodiment of the present invention.

FIG. 2 depicts circumstances 200 in which a system or apparatus for equipment use tracking and availability prediction, such as the system 100 or equipment tracker apparatus 150 described above with reference to FIG. 1, would be used. The depicted circumstances 200 are for illustrative purposes, and are not intended to be limiting, as a system or apparatus for equipment use tracking and availability prediction could be used in a variety of circumstances. In the depicted circumstances 200, the equipment tracker apparatus 150 is used at a gym 202, to track use and predict availability for gym equipment 210. In other circumstances, an equipment tracker apparatus 150 may be used at a location other than a gym 202, such as a workshop, a design studio, or the like, to track use and predict availability for equipment other than gym equipment 210, such as laser cutters, 3D printers, or the like.

In the depicted circumstances 200, a gym 202 includes multiple pieces of gym equipment 210. For example, gym equipment 210a-h may include different weight machines, racks or benches for lifting free weights, cardio machines such as treadmills, elliptical trainers, stationary bicycles, or the like, equipment for bodyweight exercises such as pull-up bars, or the like. Various types of gym equipment 210 for which an equipment tracker apparatus 150 may monitor use and predict availability will be clear in view of this disclosure. Multiple users 220 at the gym 202 may be using the equipment 210. Although one gym 202 is depicted, a system or apparatus for equipment use tracking and availability prediction, such as the system 100 or equipment tracker apparatus 150 described above with reference to FIG. 1, may monitor equipment use by users 220 at a single gym 202, a plurality of gyms 202, or the like.

In one embodiment, an equipment tracker apparatus 150, as described above, obtains information about use of the gym equipment 210 from sensing equipment 110, including cameras 112, a built-in sensor 212 and an indoor positioning system 114. Base stations for the indoor positioning system 114 are depicted. For example, the equipment tracker apparatus 150 may use the sensing equipment 110 to determine that, at the depicted time, user 220a is using gym equipment 210a, user 220b is using gym equipment 210f, and user 220c is using gym equipment 210d.

A piece of gym equipment 210b includes a built-in sensor 212, which may further aid in determining if a user 220a, 220b, 220c is using the piece of gym equipment 210b. The built-in sensor 212 may be camera, a fingerprint scanner, a card reader, or the like. While a single piece of gym equipment (e.g. 210b) includes the built-in sensor 212, other embodiments include other gym equipment (e.g. 210a, 210c-h) with built-in sensors 212. For example, each piece of gym equipment 210 may include a card reader and a user 220 may be required to swipe a card for use of the gym equipment 210 and may or may not also be required to swipe the card at the end of use of the gym equipment 210.

In a further embodiment, the equipment tracker apparatus 150 stores user profiles based on the information about use of the gym equipment 210. For example, the equipment tracker apparatus 150 may track use of the gym equipment 210a-h by the users 220a-c over multiple visits to the gym 202. The user profiles may include information about the users 220 indicating equipment use and times of use. For example, a user profile for user 220a may indicate that in previous visits to the gym, user 220a used gym equipment 210a for an average of twenty minutes.

In various embodiments, the equipment tracker apparatus 150 sends a recommendation to a user 220 indicating predicted availability for at least one piece of gym equipment 210, based on current information from the sensing equipment 110 and on the user profiles. For example, user 220b may have planned a workout involving gym equipment 210a. Current information from the sensing equipment 110 may indicate that indicating that user 220a has been using gym equipment 210a for fifteen minutes. As described above, the user profiles may indicate that user 220a uses gym equipment 210a for an average of twenty minutes per visit. Thus, based on the current information and on the user profiles, the equipment tracker apparatus 150 may send a recommendation to user 220b predicting that gym equipment 210a will likely be available in five minutes. Based on the recommendation, user 220b may decide to wait for user 220a to finish using gym equipment 210a. Conversely, if a recommendation indicates that a predicted wait time for gym equipment 210a is long, user 220b may decide to use an alternative piece of gym equipment 210 rather than waiting for gym equipment 210a to become available.

Figure 3:
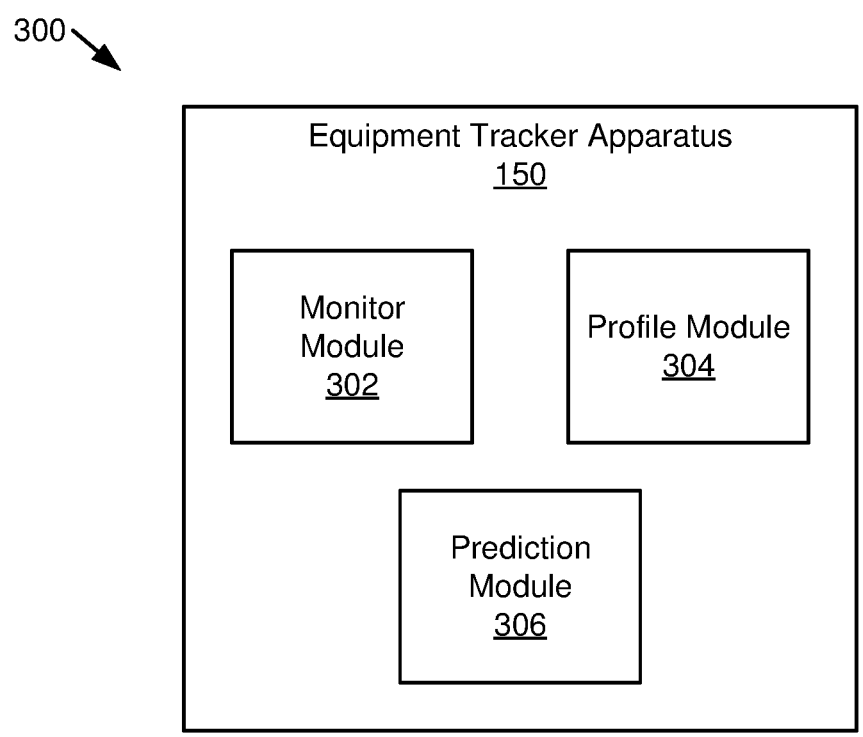
FIG. 3 is a schematic block diagram illustrating one embodiment of an apparatus for equipment use tracking and availability prediction, in accordance with one embodiment of the present invention.

FIG. 3 depicts one embodiment of an apparatus 300 for equipment use tracking and availability prediction. The apparatus 300, in the depicted embodiment, includes one embodiment of the equipment tracker apparatus 150 with a monitor module 302, a profile module 304, and a prediction module 306, which are described below.

In the depicted embodiment, the equipment tracker apparatus 150 includes a monitor module 302 that electronically monitors use of equipment by a plurality of users at one or more locations. In various embodiments, equipment may include any item or resource provided at a location such as a room, building, campus, or facility, for use by a user. For example, equipment may be design equipment at a design studio, computers at a computing lab, fabrication equipment at a fabrication studio or machine shop, gym equipment at a gym, or the like. In some embodiments, equipment may refer to equipment that is usable by a limited number of users at once (e.g., by one or two users). If equipment that is already is use is not available for use by another user, availability prediction by the equipment tracker apparatus 150 may avoid the inconvenience of waiting an indeterminate amount of time for a equipment to become available.

A gym, in various embodiments, may include any location where equipment for physical exercise is disposed and used. For example, a gym may be an indoor or outdoor location with exercise equipment, regardless of whether the location is referred to as a gym, a gymnasium, a fitness center, a health club, or the like, and may be a business, a facility provided for students, a facility provided for employees, or the like. In various embodiments, the monitor module 302 may monitor equipment use at a single gym, at multiple gyms, at a chain of gyms, or the like.

Gym equipment, in various embodiments, may include any equipment used for exercise, such as weight machines, weight racks, benches, cardio machines such as treadmills, elliptical trainers, stationary bicycles, or the like, equipment for bodyweight exercises such as pull-up bars, or the like. Users at a gym may include any person who uses gym equipment. For example, a user may be a gym member, a guest, any person who uses equipment in an open gym, or the like. Users at a location other than a gym may include any person who uses the equipment available at that location. Various types of gyms, gym equipment, and equipment users will be clear in view of this disclosure.

In certain embodiments, a piece of equipment may be an individual item of equipment, such as a single machine, rack, or bench for gym equipment, a single printer for printing equipment, a single table saw for wood shop equipment, or the like. Use of a piece of equipment by one user may exclude other users. For example, when one person is using a squat rack at a gym, other people may not be able to use the same squat rack. In certain embodiments, use of a piece of equipment by one user may partially exclude other users. For example, one person using a weight machine at a gym may be willing to allow another person to "work in" or share the machine, so that the two users alternate with one user actively using the machine and the other user resting between sets of repeated exercises. However, use of the machine by two people may exclude a third person.

In certain embodiments, the monitor module 302 may monitor or track use for at least one piece of equipment, for multiple pieces of equipment at one or more locations, for a subset of particularly busy or scarce equipment, or the like. In one embodiment, the monitor module 302 may track use for equipment where use by one user at least partially excludes other users, such as individual machines, racks, or benches, at a gym and may not track use for equipment where use does not significantly exclude other users, such as for swimming pools, running tracks, or the like. In another embodiment, however, a monitor module 302 may also monitor use by tracking a number of users, a percentage of capacity, or the like, for equipment that can be used simultaneously by multiple users.

Additionally, although examples of equipment use tracking and availability prediction are disclosed herein for gym equipment, an equipment tracker apparatus 150 including a monitor module 302, a profile module 304, and a prediction module 306 may similarly be used to track equipment use and predict availability for equipment other than gym equipment at facilities other than gyms. For example, an equipment tracker apparatus 150 may be used to track use and predict availability for fabrication equipment such as 3D printers, laser cutters, machine tools, and the like at a facility that provides a space for members to use such equipment. Various further types of equipment for which equipment use may be monitored and predicted will be clear in view of this disclosure.

The monitor module 302, in certain embodiments, may electronically monitor equipment use by obtaining information about equipment use from sensing equipment 110. In various embodiments, sensing equipment 110 may include any equipment configured to identify users and times of use for equipment. In some embodiments, identifying a user may include determining a user identity with reference to external information not produced by the sensing equipment 110, such as a list of members of a gym or other facility. For example, sensing equipment 110 may identify the user of a piece of gym equipment as gym member John Smith. In certain embodiments, identifying a user may include determining a user identity with reference to previous information produced by the sensing equipment 110. For example, sensing equipment 110 may identify a user of a piece of equipment as a new user, or as a previously identified user for whom a user profile already exists. Identifying times of use for equipment may include determining any information pertaining to when or how long a user uses a piece of equipment, such as a start time, a stop time, a duration, a number of sets for gym equipment, a per-set duration, a rest duration between sets, or the like.

In certain embodiments, sensing equipment 110 may include one or more cameras 112, visual recognition software, and/or an indoor positioning system 114, as described above. In another embodiment, sensing equipment 110 may include any other equipment capable of identifying users and/or times of use for equipment. For example, in one embodiment, sensing equipment 110 may include GPS tracking equipment in users' electronic devices 106, that reports user locations to the monitor module 302, motion sensors, and/or sensors disposed on the equipment that determine whether a user is sitting on a bench, standing on a platform, grasping a bar, or the like (e.g., pressure sensors, conductivity sensors, or the like). Various other or further types of sensing equipment 110 capable of identifying users and/or times of use for equipment will be clear in view of this disclosure.

In various embodiments, the monitor module 302 may obtain information from the sensing equipment 110 by periodically polling or requesting information from the sensing equipment 110. In another embodiment, sensing equipment 110 may "push" information to the monitor module 302, or send the information without waiting for a request, and the monitor module 302 may obtain the information by receiving, recording, or storing the information from the sensing equipment 110.

In various embodiment, obtaining information from the sensing equipment 110 may include directly obtaining user identities and times of use for the equipment, and/or may include obtaining information that indirectly identifies users and times of use. For example, in one embodiment, information obtained from an indoor positioning system 114 may include device identifiers and locations for electronic devices 106, and the monitor module 302 may look up the device identifiers in a data structure that associates device identifiers with users, and may compare the device locations to a predetermined list or map of equipment locations, to identify what equipment was in use by which users.

In various embodiments, the information obtained by the monitor module 302 from the sensing equipment 110 may vary depending on the sensing equipment 110. For example, as described above, information from an indoor positioning system 114 may include device locations, so that the sensing equipment 110 identifies that a user is using a piece of equipment while that user's electronic device 106 is located at or near the equipment (e.g., within a predefined region, within a predefined radius, closer to that piece of equipment than to other pieces of equipment, or the like). However, such information may not distinguish between active use and proximity (e.g., rest periods between sets, for gym equipment), or may incorrectly identify two users as using the same equipment when one is actively using the equipment and the other is watching, assisting, or "spotting" the first user. However, such information may still be said to identify users and times of use for equipment even if some of the information is approximate or inaccurate.

In another embodiment, information from cameras 112 and visual recognition software may similarly primarily indicate user location, or may include additional information indicating whether (or when) a user is actively using equipment or resting, whether a second user is assisting the first user (e.g., "spotting"), or whether a second user is also using the equipment (e.g., "working in" or sharing the equipment). In various embodiments, using a monitor module 302 and sensing equipment 110 to track and monitor equipment use may facilitate prediction of future equipment availability.

In the depicted embodiment, the equipment tracker apparatus 150 includes a profile module 304 that stores a plurality of user profiles based on the information about equipment use obtained by the monitor module 302. A user profile, in various embodiments may be a record, data structure, or set of information associated with a user, and may include information about that user and about equipment use by that user. The profile module 304 may store user profiles in a data storage device of the server 102 such as a hard drive, solid state drive, or the like, or may store user profiles in a data storage device accessible to the server 102 such as network-attached storage, a device on a storage area network, or the like.

The profile module 304, in various embodiments, may store user profiles in a variety of forms. For example, user profiles may be user records in a relational database, values in a key-value store with user names, numbers, or other identifiers as keys, files of information about users, or the like. In certain embodiments, the profile module 304 may store a user profile by creating a new user profile, and/or by updating an existing user profile. For example, in one embodiment, the profile module 304 may maintain new or updated information about a user in memory of the server 102 while that user is at a location or facility, and may save the new or updated information to storage (e.g., to a stored user profile) when the user leaves the location or facility. Various other or further ways for a profile module 304 to create, update, organize, maintain, and/or store user profiles will be clear in view of this disclosure.

A user profile, in various embodiments, may include information about a user indicating equipment used by that user and times of use. Information indicating equipment used may include a list of equipment used, a list of numbers or other identifiers for equipment, or the like. Information indicating times of use may include any information pertaining to when or how long a user uses a piece of equipment, such as a start time, a stop time, a duration, a number of sets, a per-set duration, a rest duration between sets, or the like. In certain embodiments, the profile module 304 may associate information indicating equipment used with information indicating times of use in a user profile. For example, a user profile may include a table, a hash table, an associative array, or the like that associates equipment names (or other identifiers) with times of use for that equipment.

In various embodiments, the user profiles stored by the profile module 304 may be based on the information about equipment use that the monitor module 302 obtained from the sensing equipment 110. A user profile, in various embodiments, may be referred to as being based on the information obtained by the monitor module 302 if the user profile includes at least part of the information obtained by the monitor module 302, or information derived from the information obtained by the monitor module 302. For example, in one embodiment, the profile module 304 may store information obtained by the monitor module 302 about a user, in that user's user profile. For example, the monitor module 302 at a gym may obtain information identifying John Smith as using the squat rack at 6:02 PM, and the profile module 304 may log that information in John Smith's user profile.

In another embodiment, however, the profile module 304 may store a summary of information obtained by the monitor module 302 about a user, in that user's user profile. For example, rather than logging that John Smith was using the squat rack at 6:02:00, 6:02:30, 6:03:00, 6:03:30, 6:04:00, 6:04:30, 6:05:00, 6:05:30, 6:06:00, 6:06:30, 6:07:00, 6:07:30, 6:08:00, 6:08:30, and 6:09:00, the profile module 304 may store a summary entry in John Smiths' user profile, indicating that John Smith used the squat rack for seven minutes, or from 6:02 to 6:09. Various ways to directly store information obtained by the monitor module 302 in user profiles, or to summarize information obtained by the monitor module 302 in user profiles, will be clear in view of this disclosure.

In one embodiment, the profile module 304 may store user profiles based on equipment use at a plurality of locations. For example, in certain embodiments, a monitor module 302 may communicate with sensing equipment 110 at multiple locations to identify which equipment is being used by which users, and when, and the profile module 304 may store a user profile including information about a user's equipment use at the multiple locations. As described below with reference to the prediction module 306, a recommendation predicting equipment availability at one location may be based on user profiles storing information relating to a plurality of locations. For example, predicted wait times for equipment at one location may be based on the user profiles for users who are present at that location, but the user profiles may include information about past equipment use by the same users, at that location and/or at other locations.

In certain embodiments, the user profiles may include information about a user in addition to information about equipment used and time of use. For example, a user profiles may include information indicating whether a user is also a member of a group for which a group profile exists, information indicating whether the user is willing to receive recommendations indicating predicted equipment availability, information indicating a user's response to recommendations (e.g., whether a user waits for equipment to become available or uses alternative equipment), information about exercises or equipment preferred by the user, information indicating what exercises a user performs using equipment, or the like.

In certain embodiments, where one piece of equipment is usable for multiple purposes, the profile module 304 may record times or durations for individual uses. For example, for gym equipment, if a single rack is usable for squats and for overhead presses, a user profile may record whether the user used that rack for squats, for overhead presses, or for both, and may record a duration for either or both exercises. Various other or further information that may be recorded in profiles by the profile module 304, and used as a basis for recommendations by the prediction module 306, will be clear in view of this disclosure.

In one embodiment, user profiles may include information indicating users who share equipment with other users (e.g., users at a gym who allow other users to "work in"). For example, a user profile for a user may include information indicating whether that user has been observed (e.g., via the monitor module 302 and the sensing equipment 110) to allow other users to share equipment or "work in," how frequently that user shares equipment with other users, whether the user shares particular pieces of equipment and does not share other pieces of equipment, or the like.

In the depicted embodiment, the equipment tracker apparatus 150 includes a prediction module 306 that sends a recommendation indicating predicted equipment availability to a user. The recommendation, in certain embodiments, may be based on current information about equipment use, obtained by the monitor module 302, and based on the user profiles stored by the profile module 304.

In various embodiments, a recommendation indicating predicted equipment availability may include any message, communication, suggestion or other information sent to a user, that directly or indirectly indicates when or whether at least one piece of equipment is predicted to be available. In certain embodiments, the prediction module 306 may predict what equipment is likely to be available, and when, based on current information about equipment use, obtained by the monitor module 302, and based on the user profiles stored by the profile module 304.

For example, the monitor module 302 may obtain current information indicating what users are present at a location, what equipment they are currently using, how long they have been using the current equipment, or the like. User profiles stored by the profile module 304 for those users may include past information equipment use and times of use for those users. The prediction module 306 may use the user profiles to identify statistical patterns such as average duration of use for a user and a piece of equipment, most likely duration of use for a user and a piece of equipment, variance or standard deviation in duration of use for a user and a piece of equipment, an interval of predicted durations of use that satisfy a confidence threshold (e.g., with 90% confidence, this user occupies a deadlift platform for 20-25 minutes), groups of equipment that are likely used together in the same workout session, or the like.

Thus, analysis of user profiles and current equipment use may suggest what equipment those users are likely to use, and how long, and therefore may allow the prediction module 306 to predict what equipment will be available and when. In various embodiments, user profiles based on accurate information from sensing equipment 110 may allow a prediction module 306 to predict equipment availability more accurately, avoiding the inconvenience or inefficiency associated with long or indeterminate wait times for busy equipment.

For example, in one embodiment the prediction module 306 may predict wait times for currently used equipment based on how long the current users have been using the equipment, and on how long those users usually use that equipment. In another embodiment, the prediction module 306 may predict that currently available equipment is likely to be busy later. For example, if multiple users at a gym are using leg-exercise equipment, and frequently do multiple leg exercises in one workout session, the prediction module 306 may predict that other leg-exercise equipment frequently used by the current users will be in high demand later. Various other or further ways to predict equipment availability based on current use information and on statistics, patterns, or other information from user profiles, will be clear in view of this disclosure.

In certain embodiments, a recommendation sent by the prediction module 306 to a user may be based on machine learning trained on the user profiles to predict equipment availability. For example, in certain embodiments, a prediction module 306 may include a function, a set of functions or the like produced by machine learning trained on the user profiles. In further embodiments, the machine learning may be periodically updated based on updated user profiles. Various machine learning techniques for identifying patterns in user profiles, predicting equipment availability based on user profiles, or the like, will be clear in view of this disclosure.

In one embodiment, a recommendation that the prediction module 306 sends to a user may directly include a prediction such as a predicted wait time, predicted high-demand time, or the like, for one or more pieces of equipment. In another embodiment, a recommendation that the prediction module 306 sends to a user may indirectly indicate or be based on a prediction such as a predicted wait time or a predicted high-demand time for a piece of equipment. For example, a recommendation indicating predicted high demand for a piece of equipment later in a user's workout session may suggest using that piece of equipment earlier in the user's workout session, without including a full prediction of demand level.

In certain embodiment, a recommendation may include a predicted wait time for a piece of equipment. For example, a recommendation sent to a user may indicate that a piece of equipment will likely be available in five minutes, in fifteen minutes, at seven o'clock, or the like. In some embodiments, a recommendation may include predicted wait times for multiple pieces of equipment. In certain embodiments, a recommendation may include a piece of equipment suggested for the user based on predicted wait times. For example, where the gym equipment that a user wants to use in one workout session is known (e.g., entered by the user, predicted based on a user profile, or the like) a recommendation may suggest using a piece of equipment with the lowest predicted wait time, or may suggest using a piece of equipment for which the current predicted wait time is moderate, but where longer wait times are predicted for that equipment later in the user's workout session.

In some embodiment, a recommendation may include a suggested time for using a piece of equipment. For example, a recommendation may indicate that demand is currently high for a piece of equipment, but that that equipment will likely be available (or available with less waiting) after six o'clock. In certain embodiments, a recommendation may include a combination of the above types of recommendation, such as current predicted wait times for equipment and a recommended order for using equipment in, or the like. Various other or further types of recommendations indicating predicted equipment availability will be clear in view of this disclosure.

In one embodiment, as described above, user profiles may include information indicating users who "work in" or share equipment with other users. In a further embodiment, a recommendation sent by the prediction module 306 may include a prediction that a current user for a piece of equipment will share that piece of equipment. A prediction that a current user will share a piece of equipment may include a prediction that it is likely for the user to share to share the equipment, an indicator or prediction of how likely it is for the user to share the equipment, a suggestion that a user ask to share the equipment, or the like. For example, if a piece of high-demand equipment is in use by a current user, and if the current user's user profile indicates that they are likely to share that piece of equipment, or to share equipment generally, the prediction module 306 may send a recommendation to another user suggesting that they ask to share the equipment.

As described above, recommendations may be based on user profiles and on current information. For example, recommendation may be based on user profiles of current users. However, in certain embodiments, some current users of equipment may be new users, for whom the profile module 304 has not yet stored a user profile. The prediction module 306 may use a default user profile, average information about equipment use across multiple users, or the like, to predict equipment use by new users and to predict equipment availability when new users are present. The prediction module 306 may similarly use information from multiple user profiles to predict equipment use and availability when a user for whom a user profile exists uses equipment he or she has not previously used.

The prediction module 306, in various embodiments, may communicate with a user in various ways to send a recommendation to the user. For example, in one embodiment, a smartphone application may provide a user interface for receiving recommendations, and the prediction module 306 may communicate with the smartphone application. In another embodiment, a user may receive a recommendation via a web page, text message, email, or the like. Various other or further ways to send a recommendation to a user will be clear in view of this disclosure.

In one embodiment, as described above, user profiles may be based on equipment use at a plurality of locations. In a further embodiment, a recommendation sent to a user by the prediction module 306 may indicate predicted equipment availability at that user's location (e.g., a location that the user is currently present at, a facility that the user most often uses, a facility that the user is not currently present at but has requested recommendations for, or the like). For example, even if a user is new to one facility, the prediction module 306 may predict equipment use by that user based on a user profile with information about equipment use for that user at other locations, and may incorporate that predicted equipment use with predicted equipment use for other users to predict equipment availability, and to send a recommendation to a user.

In a certain embodiment, the prediction module 306 may send a plurality of recommendations to a plurality of users in response to determining that the plurality of recommendations are non-conflicting. In various embodiments, recommendations may conflict if they would lead two of more users to attempt to use the same piece of equipment at the same time. For example, if the prediction module 306 predicts that a current user will finish using a piece of equipment in five minutes, it may send a recommendation to a user indicating a predicted five minute wait time for that equipment. However, sending the same recommendation to another user would result in a conflict: two users would attempt to use the same equipment at the same time. One user would find the equipment available, and the other user would find the equipment newly in use. Thus, in certain embodiments, the prediction module 306 may determine that multiple recommendations are non-conflicting before sending the recommendations to different users.

For example, in one embodiment, the prediction module 306 may send a first recommendation to a first user, send a second recommendation that does not conflict with the first recommendation to a second user, send a third recommendation that does not conflict with the first and second recommendations to a third user, and so on. In further embodiments, the prediction module 306 may resolve a conflict between recommendations by replacing one of the conflicting recommendations with a different, non-conflicting recommendation before sending the recommendation. In another embodiment, the prediction module 306 may generate a set of recommendations for multiple users, determine where recommendations conflict, and replace conflicting recommendations prior to sending the set of recommendations to the users. Various ways of detecting conflicts and sending non-conflicting recommendations will be clear in view of this disclosure.

In some embodiments, the equipment is gym equipment, a workout plan for a user includes multiple exercises, and the recommendation sent to the user by the prediction module 306 includes predicted equipment availability for at least one exercise selected from the workout plan.

A workout plan may be a plan for a user's workout session, and may include an ordered or unordered set of exercises the user plans to do during a workout session. In one embodiment, a workout plan may be specified by a user. For example, the equipment tracker apparatus 150 may communicate with a user's electronic device 106 to present a workout plan interface via a mobile application, a web page, or the like, and the user may use the interface to specify individual exercises for a new workout plan, select a default workout plan such as a leg workout, a back workout or an arm workout, select a previously used workout plan, modify a default or previously used workout plan, or the like.

In another embodiment, a workout plan may be suggested by the prediction module 306. The prediction module 306 may suggest a workout plan based on current information about equipment use, obtained by the monitor module 302, and based on the user profiles stored by the profile module 304. For example, in one embodiment, the prediction module 306 may determine that multiple users are doing leg workouts, and may suggest an arm workout plan to another user. In a certain embodiment, the prediction module 306 may suggest a workout plan to a user based on current information including that user's current activity, and based on at least that user's user profile. For example, the prediction module 306 may identify a user who is using chest equipment, and who frequently does multiple chest exercises on the same day, and may suggest a chest workout plan to the user. A user may receive a suggested workout plan via an interface (e.g., via a web page or mobile app), and may accept the workout plan, reject the workout plan, modify the workout plan, or the like.

In one embodiment, a workout plan may include exercises at an equipment-use level of granularity. For example, exercises may include items such as "use squat rack," "use inclined bench" or the like. A user who knows what equipment they want to use may specify a workout plan by specifying equipment. In another embodiment, a workout plan may include exercises at a finer level of granularity, and the exercises may be associated with equipment to use. For example, exercises may be overhead presses using the squat rack and inclined bench presses using the inclined bench.

In various embodiments, where a workout plan for a user includes multiple exercises, the prediction module 306 may send a recommendation to the user that indicates predicted equipment availability for at least one exercise selected from the workout plan (e.g., for the equipment used for that exercise). For example, if the workout plan includes "bench press" or "use flat bench," the prediction module 306 may send a recommendation to the user indicating predicted equipment availability for a bench (e.g., predicting wait times for a bench, suggesting a time to use the bench, or the like). An exercise selected from a workout plan, for which the prediction module 306 sends a recommendation indicating predicted equipment availability, may be an exercise selected by a user, an exercise suggested by the prediction module 306, or the like.

In one embodiment, the prediction module 306 may select at least one exercise from the workout plan, and may send a recommendation to the user that indicates predicted equipment availability for that exercise. For example, the prediction module 306 may send a recommendation suggesting that a user perform a particular exercise or use a particular piece of equipment based on predicted wait times, predicted demand, or the like. In another embodiment, a user may select an exercise from a workout plan (e.g., the exercise that he or she would like to do next), and the prediction module 306 may send a recommendation indicating predicted equipment availability for that exercise. In another embodiment, the prediction module 306 may send a recommendation indicating predicted equipment availability for more than one exercise in a user's workout plan, and the user may select which exercise to do next based on the recommendation.

In a certain embodiment, the prediction module 306 may send a further recommendation to a user indicating predicted equipment availability for a remaining exercise on the workout plan in response to the user completing an exercise on the workout plan. For example, if a user's workout plan includes five exercises, and the user completes one of the exercises, the user may indicate that the exercise is complete via an interface on the user's electronic device 106, or the monitor module 302 may determine that the user has finished using a piece of equipment. In response, the prediction module 306 may send an updated recommendation to the user, indicating predicted equipment availability for at least one of the four remaining exercises on the workout plan.

Figure 4:
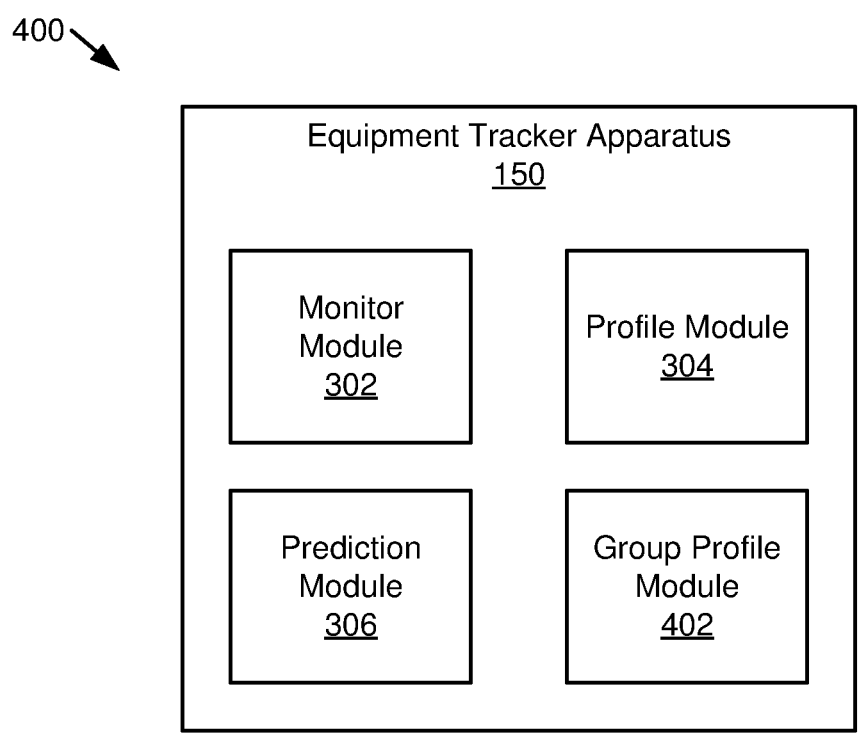
FIG. 4 is a schematic block diagram illustrating another embodiment of an apparatus for equipment use tracking and availability prediction, in accordance with one embodiment of the present invention.

FIG. 4 depicts another embodiment of an apparatus 400 for equipment use tracking and availability prediction. In the depicted embodiment, the apparatus 400 includes an embodiment of the equipment tracker apparatus 150, including a monitor module 302, a profile module 304, and a prediction module 306, which may be substantially as described above with reference to the apparatus 300 of FIG. 3. In the depicted embodiment, the equipment tracker apparatus 150 includes a group profile module 402 which is described below.

In the depicted embodiment, the equipment tracker apparatus 150 includes a group profile module 402 that identifies a group of users using the equipment together (e.g., a group of users exercising together at a gym) based on the information about equipment use. For example, the group profile module 402 may identify a group of users by determining that certain pieces of equipment are used in rotation by the users in the group, by determining that the users are frequently located together, determining that the users frequently enter or leave a location or facility together. The group profile module 402 may use information from the sensing equipment 110 to identify a group of users.

In a further embodiment, the group profile module 402 may store a group profile comprising information about equipment use by a group. In certain embodiments, a group profile may be similar to a user profile, as described above, and may include information indicating equipment used and times of use, but for a group rather than for individual users. In a certain embodiment, a recommendation sent by the prediction module 306 may be based on a group profile stored by the group profile module 402. Certain users may use equipment differently when in a group than they do individually. For example, a user who is willing to share equipment with other users when alone may be unwilling to share equipment with users outside the group if it would disrupt the group's plans. As another example, a user may use the same equipment in a group as he or she does when alone, but may use the equipment for longer or shorter durations based on the group's plans. Thus, in certain embodiments, a recommendation may be based on user profiles for current users who are using the equipment alone, and may further be based on a group profile for a group identified by the group profile module 402 as currently using the equipment together.

Figure 5:
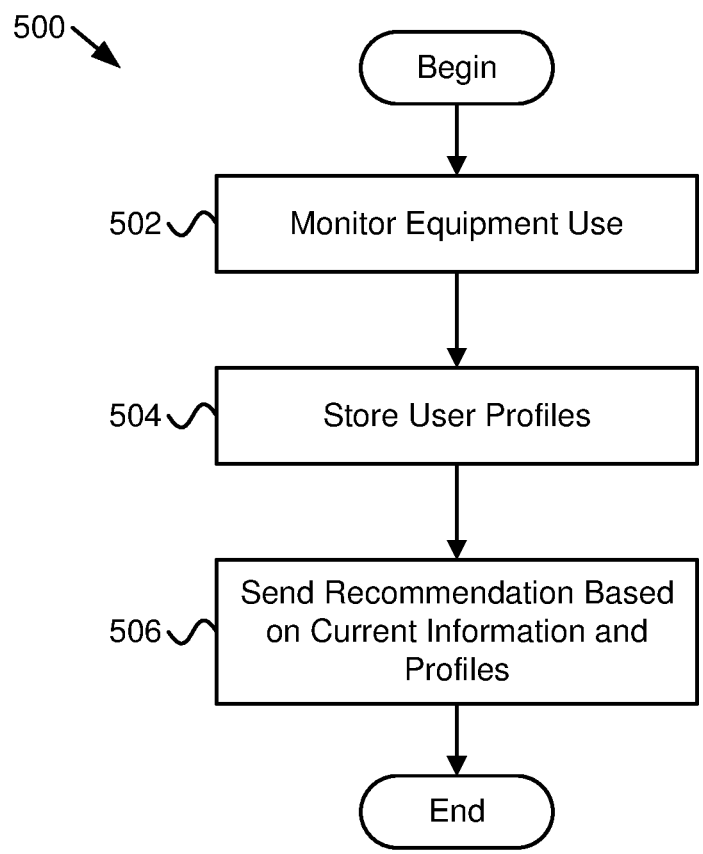
FIG. 5 is a schematic flow chart diagram illustrating one embodiment of a method for equipment use tracking and availability prediction, in accordance with one embodiment of the present invention.

FIG. 5 is a schematic flow chart diagram illustrating one embodiment of a method 500 for equipment use tracking and availability prediction. The method 500 begins, and electronically monitors 502 equipment use by a plurality of users at one or more locations. In one embodiment, the monitor module 302 electronically monitors 502 equipment use by obtaining information from sensing equipment 110. The method 500 stores 504 a plurality of user profiles based on the information about equipment use. In one embodiment, the profile module 304 stores 504 user profiles. The method 500 sends 506 a recommendation indicating predicted equipment availability to a user based on current information about equipment use and on the user profiles, and the method 500 ends. In one embodiment, the prediction module 306 sends 506 the recommendation.

Figure 6:
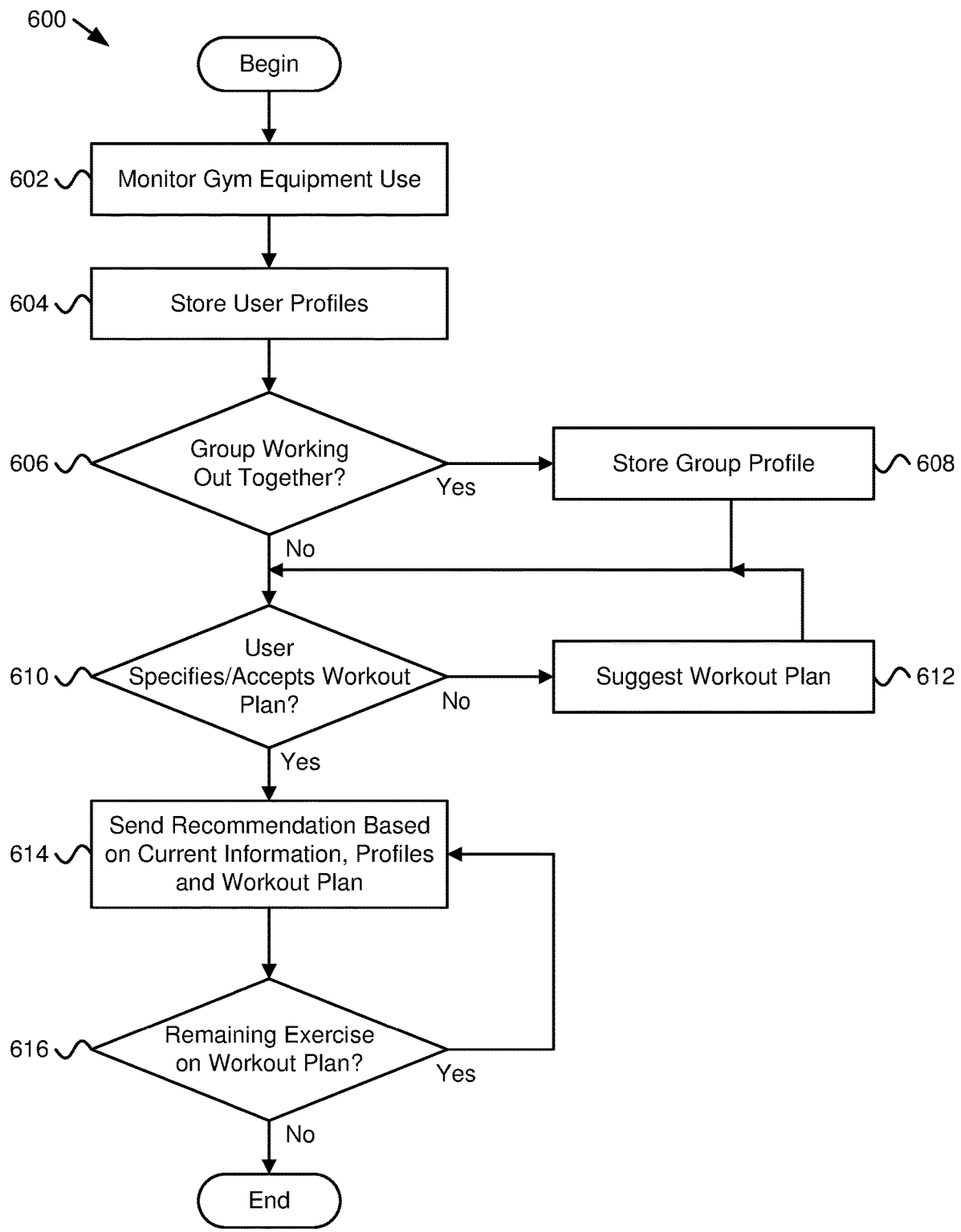
FIG. 6 is a schematic flow chart diagram illustrating another embodiment of a method for equipment use tracking and availability prediction, in accordance with one embodiment of the present invention.

FIG. 6 is a schematic flow chart diagram illustrating another embodiment of a method 600 for equipment use tracking and availability prediction. The method 600 begins, and electronically monitors 602 gym equipment use by a plurality of users at one or more gyms. In one embodiment, the monitor module 302 electronically monitors 602 gym equipment use by obtaining information from sensing equipment 110. The method 600 stores 604 a plurality of user profiles based on the information about gym equipment use. In one embodiment, the profile module 304 stores 604 user profiles.

The method 600 determines 606 whether a group of users is exercising or working out together. In one embodiment, the group profile module 402 determines 606 whether a group of users is exercising or working out together. If a group of users is exercising or working out together, the method 600 stores 608 a group profile including information about equipment use by the group. In one embodiment, the group profile module 402 stores 608 the group profile.

The method 600 continues, and determines 610 whether a user has specified or accepted a workout plan. In one embodiment, the prediction module 306 may determine 610 whether a user has specified or accepted a workout plan. If a user has not specified a workout plan, the method 600 suggests 612 a workout plan. In one embodiment, the prediction module 306 may suggest 612 the workout plan. The method 600 may iteratively suggest 612 workout plans and determine 610 whether a user has specified or accepted a workout plan, until the user has specified or accepted a workout plan.

The method 600 sends 614 a recommendation indicating predicted gym equipment availability to a user based on current information about gym equipment use, user and/or group profiles, and the user's workout plan. In one embodiment, the prediction module 306 may send 614 the recommendation. In response to a user completing an exercise on the workout plan, the method 600 may determine 616 whether at least one exercise remains on the workout plan. In one embodiment, the prediction module 306 may determine 616 whether an exercise remains on the workout plan. If at least one exercise remains, the method 600 continues, and sends 614 a further recommendation indicating predicted gym equipment availability for a remaining exercise on the workout plan. If no exercise remains on the workout plan, the method 600 ends.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
    a monitor module that electronically monitors use of equipment by a plurality of users at one or more locations, by obtaining information about equipment use from sensing equipment that identifies users and times of use for the equipment;
    a profile module that stores a plurality of user profiles based on the information about equipment use, wherein the user profiles comprise information about the users indicating equipment used and time of use; and
    a prediction module that sends a recommendation indicating predicted equipment availability to a user based on current information about equipment use and on past usage information of the equipment from the user profiles,
    wherein at least a portion of said modules comprise one or more of hardware circuits, programmable hardware devices and executable code, the executable code stored on one or more computer readable storage media, and
    wherein the equipment is gym equipment, a workout plan comprises multiple exercises, and the recommendation indicates predicted equipment availability for at least one exercise selected from the workout plan.

2. The apparatus of claim 1, wherein the sensing equipment comprises at least one camera that obtains images of the equipment, and visual recognition software that identifies users based on the images.

3. The apparatus of claim 1, wherein the sensing equipment comprises an indoor positioning system that tracks locations of users' electronic devices.

4. The apparatus of claim 1, further comprising a group profile module that identifies a group of users using the equipment together based on the information about equipment use, and that stores a group profile comprising information about equipment use by the group, wherein the recommendation is further based on the group profile.

5. The apparatus of claim 1, wherein the user profiles are based on equipment use at a plurality of locations and the recommendation indicates predicted equipment availability at the user's location.

6. The apparatus of claim 1, wherein the prediction module sends a plurality of recommendations to a plurality of users in response to determining that the plurality of recommendations are non-conflicting.

7. The apparatus of claim 1, wherein the workout plan is specified by the user.

8. The apparatus of claim 1, wherein the workout plan is suggested by the prediction module based on the current information about equipment use and the user profiles.

9. The apparatus of claim 1, wherein the prediction module sends a further recommendation to the user indicating predicted equipment availability for a remaining exercise on the workout plan in response to the user completing an exercise on the workout plan.

10. The apparatus of claim 1, wherein the recommendation is based on machine learning trained on the user profiles to predict equipment availability.

11. The apparatus of claim 1, wherein the recommendation comprises one or more of:
   a predicted wait time for a piece of equipment;
   a piece of equipment suggested for the user based on predicted wait times; and
   a suggested time for using a piece of equipment.

12. The apparatus of claim 1, wherein the user profiles comprise information indicating users who share equipment with other users, and the recommendation comprises a prediction that a current user for a piece of equipment will share the piece of equipment.

13. A system comprising:
   sensing equipment that identifies users and times of use for equipment at one or more locations;
   a monitor module that electronically monitors use of the equipment by a plurality of users, by obtaining information about equipment use from the sensing equipment;
   a profile module that stores a plurality of user profiles based on the information about equipment use, wherein the user profiles comprise information about the users indicating equipment used and time of use; and
   a prediction module that sends a recommendation indicating predicted equipment availability to a user based on current information about equipment use and on the user profiles,
   wherein the equipment is gym equipment, a workout plan comprises multiple exercises, and the recommendation indicates predicted equipment availability for at least one exercise selected from the workout plan, and
   wherein at least a portion of said modules comprise one or more of hardware circuits, programmable hardware devices and executable code, the executable code stored on one or more computer readable storage media.

14. The system of claim 13, wherein the sensing equipment comprises at least one camera that obtains images of the equipment, and visual recognition software that identifies users based on the images.

15. The system of claim 13, wherein the sensing equipment comprises an indoor positioning system that tracks locations of users' electronic devices.

16. A computer-implemented method for equipment use tracking and availability prediction comprising:
   electronically monitoring use of equipment by a plurality of users at one or more locations, by obtaining information about equipment use from sensing equipment that identifies users and times of use for the equipment;
   storing a plurality of user profiles based on the information about equipment use, wherein the user profiles comprise information about the users indicating equipment used and time of use; and
   sending a recommendation indicating predicted equipment availability to a user based on current information about equipment use and on the user profiles, wherein the equipment is gym equipment, a workout plan comprises multiple exercises, and the recommendation indicates predicted equipment availability for at least one exercise selected from the workout plan.

17. The computer-implemented method of claim 16, further comprising:
   identifying a group of users using the equipment together based on the information about equipment use; and
   storing a group profile comprising information about equipment use by the group, wherein the recommendation is further based on the group profile, wherein the equipment is gym equipment, a workout plan comprises multiple exercises, and the recommendation indicates predicted equipment availability for at least one exercise selected from the workout plan.

18. The computer-implemented method of claim 16, further comprising sending a further recommendation to the user indicating predicted equipment availability for a remaining exercise on the workout plan in response to the user completing an exercise on the workout plan.

* * * * *